United States Patent
Thorne et al.

(10) Patent No.: US 8,633,960 B2
(45) Date of Patent: Jan. 21, 2014

(54) COMMUNICATION DEVICE FOR PROCESSING PERSON ASSOCIATED PICTURES AND VIDEO STREAMS

(75) Inventors: Nick Thorne, Southampton (GB); John Kinghorn, Brockenhurst (GB)

(73) Assignee: ST-Ericsson SA, Plan-les-Ouates (CH)

( * ) Notice: Subject to any disclaimer, the term of this patent is extended or adjusted under 35 U.S.C. 154(b) by 803 days.

(21) Appl. No.: 12/449,678

(22) PCT Filed: Feb. 13, 2008

(86) PCT No.: PCT/IB2008/050518
§ 371 (c)(1),
(2), (4) Date: Jan. 27, 2010

(87) PCT Pub. No.: WO2008/102283
PCT Pub. Date: Aug. 28, 2008

(65) Prior Publication Data
US 2010/0149303 A1 Jun. 17, 2010

(30) Foreign Application Priority Data
Feb. 20, 2007 (EP) .................................... 07003477

(51) Int. Cl.
*H04N 7/14* (2006.01)
(52) U.S. Cl.
USPC .................................... 348/14.02; 348/14.08
(58) Field of Classification Search
USPC ...................... 348/14.02, 14.01, 14.08, 14.09
See application file for complete search history.

(56) References Cited

U.S. PATENT DOCUMENTS

| | | | |
|---|---|---|---|
| 6,657,538 B1 * | 12/2003 | Ritter | 455/411 |
| 2003/0093790 A1 | 5/2003 | Logan et al. | |
| 2004/0041904 A1 * | 3/2004 | Lapalme et al. | 348/14.08 |
| 2004/0047461 A1 * | 3/2004 | Weisman et al. | 379/202.01 |
| 2006/0020630 A1 | 1/2006 | Stager et al. | |
| 2006/0092269 A1 * | 5/2006 | Baird et al. | 348/14.08 |

FOREIGN PATENT DOCUMENTS

| | | |
|---|---|---|
| GB | 2 372 131 A | 8/2002 |
| JP | 2002-245560 A | 8/2002 |
| JP | 2003-187352 A | 7/2003 |
| WO | WO 2006/016282 A2 | 2/2006 |

OTHER PUBLICATIONS

International Search Report dated Jun. 18, 2008 in connection with PCT Patent Application No. PCT/IB2008/050518.
Written Opinion of the International Searching Authority dated Jun. 18, 2008 in connection with PCT Patent Application No. PCT/IB2008/050518.
Marc Davis, et al., "Mobile Media Metadata for Mobile Imaging", 2004 IEEE International Conference on Multimedia and Expo (ICME), p. 1707-1710.
Risto Sarvas, et al., "Metadata Creation System for Mobile Images", MobiSys '04, Jun. 6-9, 2004, p. 36-48.

* cited by examiner

Primary Examiner — Stella Woo
(74) Attorney, Agent, or Firm — Coats & Bennett, P.L.L.C.

(57) ABSTRACT

A communication device (1, 1', 1") with at least one wireless communication channel is configured to receive digital pictures and/or video streams from at least one remote source. The communication device (1, 1', 1") is configured to test whether at least one person who is/are associated with said communication device by pre-stored person identification data is identifiable in the digital pictures and/or video streams of the remote source, and to process the digital pictures and/or video streams of the remote source only if the result of the person identification test is positive.

43 Claims, 5 Drawing Sheets

COMMUNICATION DEVICE FOR PROCESSING PERSON ASSOCIATED PICTURES AND VIDEO STREAMS

CROSS-REFERENCE TO RELATED APPLICATION(S)

The present application claims priority under 35 U.S.C. §365 to International Patent Application No. PCT/IB2008/050518 filed Feb. 13, 2008, entitled "COMMUNICATION DEVICE FOR PROCESSING PERSON ASSOCIATED PICTURES AND VIDEO STREAMS". International Patent Application No. PCT/IB32008/050518 claims priority under 35 U.S.C. §365 and/or 35 U.S.C. §119(a) to European Patent Application No. 07003477.2 filed Feb. 20, 2007 and which are incorporated herein by reference into the present disclosure as if fully set forth herein.

FIELD OF THE INVENTION

The invention relates to a communication device with at least one wireless communication channel being configured to receive digital pictures and/or video streams from at least one remote source.

BACKGROUND OF THE INVENTION

Mobile phones having a camera are proliferating at a rapid pace. Driven through the low cost of cameras, the percentage of camera phones among all mobile phones is rapidly increasing as well. The expectation is that in a few years almost every mobile phone will be equipped with a camera. Voice calls have been made more convenient by addition of hands free capability to mobile phones and other portable devices. These remove the need for the user to hold the phone to the ear.

In future, phones and other portable devices will carry more video call traffic. It will be possible to use a head mounted (e.g. ear or spectacle) camera to create a "see what I see" video or still-picture stream that is transmitted to corresponding communication devices or systems.

However, creating a hands free "see my face" video or still-picture transmission is probably unfeasible as the resulting mounting appendage will be aesthetically undesirable.

The rapidly decreasing costs of cameras paired with an ever increasing quality and miniaturization makes it also possible to incorporate cameras in a wide range of mobile communication devices like PDAs, etc. Said mobile communication devices are usually equipped with communication means comprising wireless LAN interfaces, Bluetooth devices etc., thereby being able to communicate with various other devices within the range of the built-in communication means.

On the other hand, digital cameras (still pictures and video) that are equipped with communication means, like wireless LAN interfaces, Bluetooth devices etc., become more and more popular. Although still called "cameras" these devices have become multi-functional communication devices.

An image-based information retrieval system is disclosed in the published US patent application US 2006/0012677 A1. This image-based information retrieval system includes a mobile telephone and a remote server. The mobile telephone has a built-in camera and a communication link for transmitting an image from the built-in camera to the remote server. The remote server has an optical character recognition engine for generating a first confidence value based on an image from the mobile telephone, an object recognition engine for generating a second confidence value based on an image from the mobile telephone, a face recognition engine for generating a third confidence value based on an image from the mobile telephone, and an integrator module for receiving the first, second, and third confidence values and generating a recognition output.

The known image-based information retrieval system, however, is a very complicated system requiring among other devices a remote server. Communication takes place only between the mobile telephone and the remote server. Further, the known solution is focused on making an image search faster in order to create business models that are particularly suited for a commercial roll-out of an image-based search service. What is more, the known solution does not provide for exchanging video and still-picture streams among portable communication devices.

OBJECT AND SUMMARY OF THE INVENTION

Accordingly, there still exists a need for more effective use of the facilities provided by a mobile communication device being equipped with a camera. Particularly, there is a need to enhance carrying out so called "see my face" video transmission without annoying the user with unwieldy holders, stands or the like.

The present invention satisfies this need. It allows "see my face" hands free picture and video transmission among a great variety of portable and stationary communication devices, like e.g. mobile phones or digital cameras (stills and video) equipped with local area wireless networking.

The invention is particularly usable in situations where various communication devices including devices with wireless hands free cameras are co-located.

In order to achieve the object defined above, with a communication device according to the invention characteristic features are provided so that a communication device according to the invention can be characterized in the way defined below, that is:

A communication device with at least one wireless communication channel being configured to receive digital pictures and/or video streams from at least one remote source, wherein the communication device is configured to test whether at least one person who is/are associated with said communication device by pre-stored person identification data is identifiable in the digital pictures and/or video streams of the remote source, and to process the digital pictures and/or video streams of the remote source only if the result of the person identification test is positive.

The characteristic features according to the invention provide the advantage that "see my face" picture and video recordings on the user's device become feasible.

It should be observed that the communication device according to the invention can also act as remote source.

Embodiments of the present invention provide the advantage that the communication device may rely on person identification data provided by a remote source.

Embodiments of the present invention provide the advantage that a very high person recognition rate can be achieved.

Embodiments of the present invention provide the advantage that in those cases where the person identification data are not delivered by the remote source they can be obtained by the communication device itself.

Embodiments of the present invention provide the advantage that the communication device according to the invention can process both pictures and videos taken by its own camera and pictures and videos delivered by remote sources. Further, it can generate and broadcast face recognition coefficients.

Embodiments of the present invention allow to train the communication device with the face recognition parameters of its primary user and further users, like family members.

Embodiments of the present invention allow easy hands free picture and video taking.

Embodiments of the present invention provide the advantage that video conference calls can be established with other communication devices yielding a resulting video stream that is automatically switched to the person speaking at the moment. If more than one person is speaking then the video feed can e.g. go back to a global view, which could be a matrix of all the video streams being recorded at the same time by the various devices, or just a general room level view, or the like.

Embodiments of the present invention assist in automatically tracking the cameras to the persons of interest. This may be useful to create an automatic image stabilizer.

The aspects defined above and further aspects of the invention are apparent from the exemplary embodiments to be described hereinafter and are explained with reference to these exemplary embodiments.

BRIEF DESCRIPTION OF THE DRAWINGS

The invention will be described in more detail hereinafter with reference to exemplary embodiments. However, the invention is not limited to these exemplary embodiments.

DESCRIPTION OF EMBODIMENTS

Figure 1:
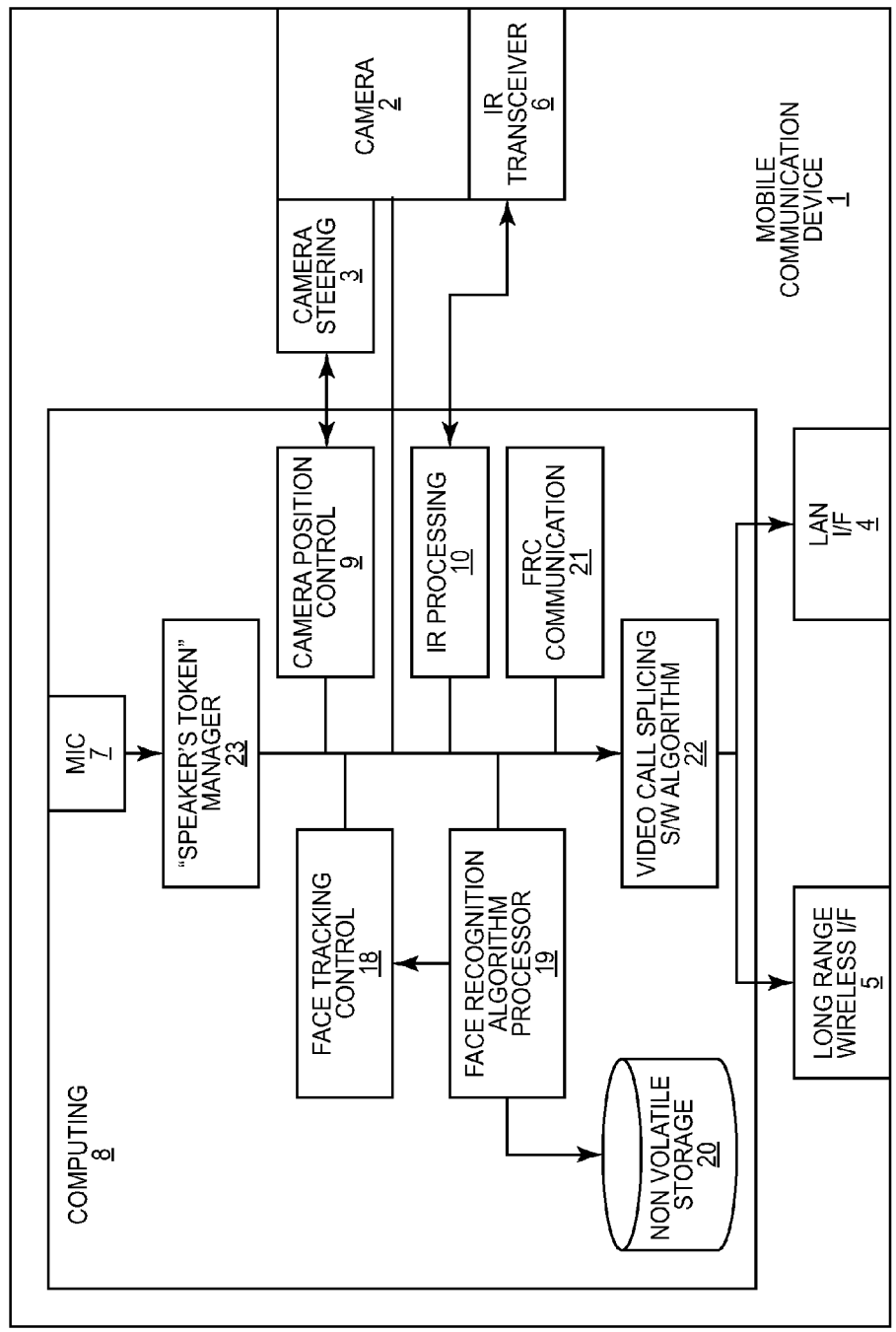
FIG. 1 shows a device hardware and software block diagram of a mobile communication device according to the present invention.

A first example of the present invention is based on the scenario that a user is walking along a street. He carries a mobile communication device 1 being configured as a mobile phone. The communication device 1 is schematically shown in the block circuit diagram according to FIG. 1. It comprises a camera 2 and camera steering means 3 enabling the user to make a video call while he is walking in the street.

The mobile communication device 1 further comprises a local wireless network interface 4, a long range wireless network interface 5, an IR transceiver 6 and a microphone 7 plus all the other hardware components that are conventional parts of a mobile phone, like a speaker, a display, keys, and so on, which for the sake of clarity are not shown in the drawings, because they are common knowledge to those persons who are experienced in the field of mobile communication devices.

Figure 3:
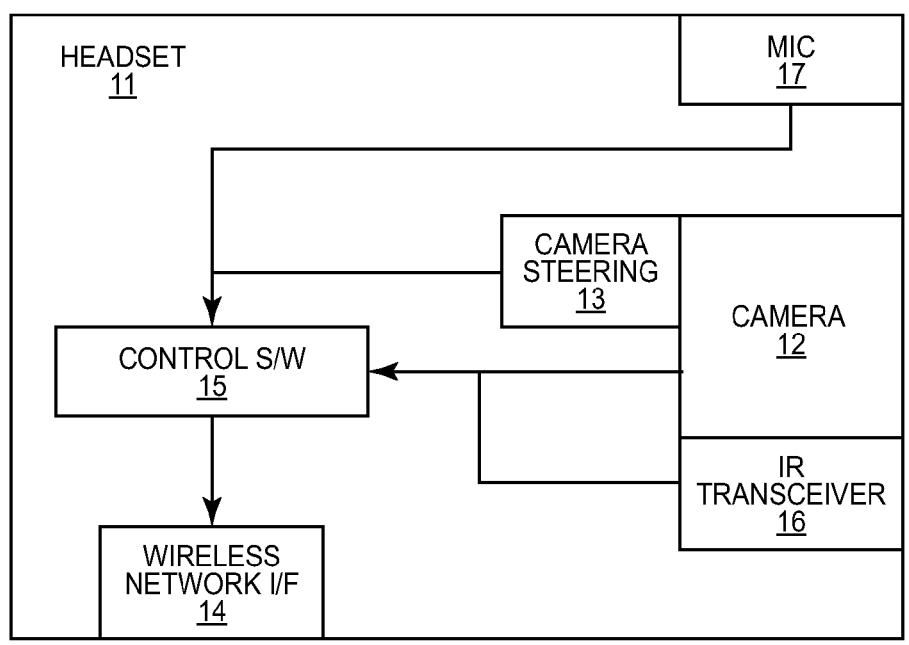
FIG. 3 shows a block diagram of a wireless hands free headset according to the present invention.

The mobile communication device 1 may optionally be linked to a headset 11, being schematically shown in the block diagram of FIG. 3. The headset 11 comprises a camera 12 and camera steering means 13. It further comprises a local wireless network interface 14, an IR transceiver 16, a microphone 17 and a control software 15 controlling and monitoring all functions of the headset 11. Using the camera 12 of the headset 11 to take pictures and/or video streams instead of the camera 2 of the communication device 1 allows the user to make hands free video calls. The headset 11 communicates with the communication device 1 either via the respective local wireless network interfaces 4, 14 or the IR transceivers 6, 16. The headset 11 further comprises mounting means (not shown in the drawings) to detachably fix the headset such that it acquires the user's field of view, e.g. when it is mounted on an ear of the user. The control software 15 further comprises means of compressing the pictures and/or videos taken by the camera 12 for transmitting them to the mobile communication device 1 with reduced bandwidth.

As the user walks, he enters the field of view of other people passing nearby also using mobile communication devices with built-in cameras and wireless network interfaces or even the field of view of specifically placed fixed cameras attached to Wifi (or other wireless) hotspots, e.g. security cameras. His own mobile communication device 1 tries to establish a communication with said other devices in order to patch into still pictures and/or video clips generated by said devices as they are available, but only if they contain images of him. In order to make a decision whether or not the pictures and/or videos taken by the remote devices contain pictures of said user his mobile communication device 1 comprises computing means 8 being adapted to execute computer programs comprising the following main functions:

A face recognition algorithm processor 19 that continually scans the pictures and/or videos generated by the camera 2. Strictly speaking the face recognition algorithm processor 19 receives the same video information that is sent to a viewfinder of the communication device 1. The face recognition algorithm processor 19 comprises a pattern recognition algorithm that is specifically tailored to generate face recognition coefficients (FRC).

Storage means 20 for storing face recognition coefficients (FRC) in a non volatile manner. The storage means 20 contain the FRC of the primary user of the communication device 1 and optionally FRCs of other users, like family members of the primary user, etc. All these FRCs can be generated when the user takes a picture of himself and optionally of additional users which pictures are analyzed by the recognition algorithm processor 19 in order to derive the FRCs which are then automatically stored in the storage means 20.

FRC communication means 21 including a FRC hailing protocol, a FRC monitor and correlator and a FRC based video request generator.

A video call splicing software algorithm 22 that splices picture or video streams so that they may be fed to both the local wireless network interface 4 and the long range wireless network interface 5.

Infrared (IR) processing means 10 being adapted to control the IR transceiver 6.

Camera position control means 9 being adapted to control the camera steering means 3.

A face tracking control 18 being adapted to track faces that have been recognized in the picture or video stream.

A "speaker's token" manager 23 which will be explained in more detail below.

As this is an important feature of the present invention, the protocol for hailing face recognition parameters is expanded in the following section.

Once a mobile communication device 1 is put into a so called "video conference mode" in which it can exchange picture and video streams with other communication devices 1, it will commence broadcasting of an advertising code on its local wireless network interface 4. This advertising code would be pre-standardized amongst mobile communication devices 1 with this capability. It is suggested to use a mechanism similar to Bluetooth profile detection.

A mobile communication device 1 in range of the wireless network will receive this advertising code, as well as broadcasting it's own. If it is also participating in a video based activity (which could include merely taking a video recording), then this second mobile communication device 1 can detect a correlation between the stored owner's and broadcast face recognition coefficients FRC. It will then request and store the transmitted picture or video content from the nearby other mobile communication device 1.

Face recognition coefficients will be broadcast for a short time after the image has been acquired, let us say 5 minutes. This is because the people within the image are likely to move away from the scene after a relatively short period of time. If the face recognition coefficients are broadcast over a longer period of time, then there is the possibility of the images being received by other devices whose owners share similar face recognition coefficients to those in the content.

It should be noted that a mobile communication device 1 could also store the face recognition coefficients FRC of family members in its FRC storage means 20 as well, so that any nearby mobile communication device 1 creating content with family members included would be detected by the owner's device.

A mobile communication device 1 could process the FRC hailing channel even if it is not itself generating video content or in a video call. This would allow it to store up content of potential interest from other mobile communication devices 1.

Now a second example is given for practical use of the present invention. Imagine a video conference is taking place among three people sitting in a room, all with mobile communication devices 1 being configured as mobile phones and headsets 11 comprising cameras 12, ear mounted. The mobile communication devices 1 may be configured as hands free mobile phones.

Each person has the other two in their "see what I see" camera view for considerable amounts of the call. In fact, they will most probably be looking at the person speaking most of the time.

Each communication device 1 has been trained with the face recognition coefficients for it's primary user.

The video conference call would consist of a video stream of the person speaking. The person speaking is decided collaboratively by "speaker's token" managers 23 in the mobile communication devices 1 in the local network by detecting the microphone 7 with the loudest signal. This allows the group of mobile communication devices 1 to collaboratively manage the "speaker's token".

When a mobile communication device 1 has the "speaker's token", it can then query the other mobile communication devices 1 for face recognition coefficients. One or more of the other mobile communication devices 1 will respond with the correct face recognition coefficient. i.e. their users will be looking at the person speaking.

The "speaker's token" holder will then tag the video signal from one of the other mobile communication devices 1 as "speaker's token holder's face". This feed will then become the primary video conference video feed.

If more than one person is speaking, then the video feed would go back to a global view, which could be a matrix of all the hands free cameras of the mobile communication devices 1, or just a general room level view.

Figure 2:
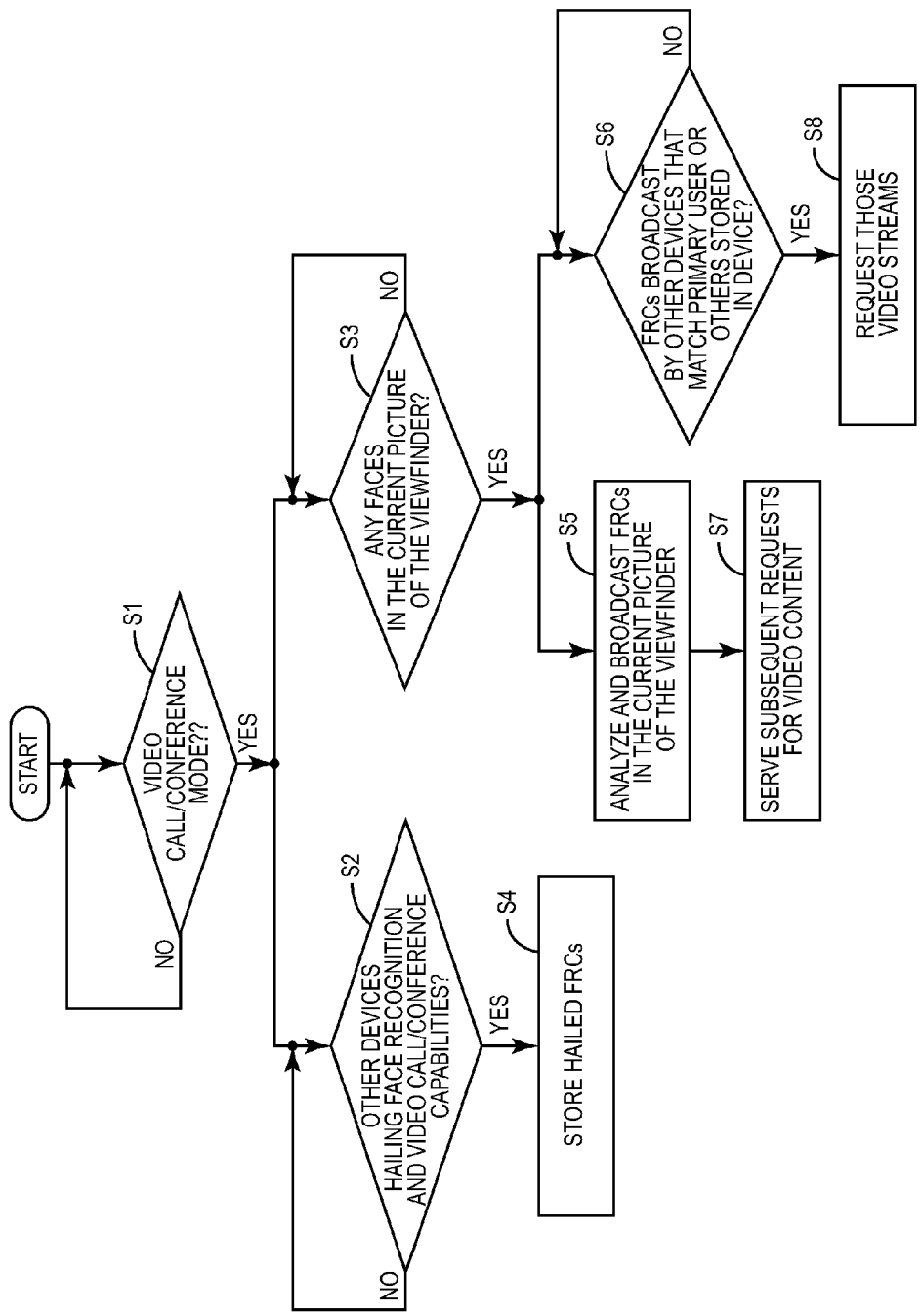
FIG. 2 shows a flow chart for video and face recognition parameter communications according to the present invention.

The procedure according to the invention being executed in the mobile communication device 1 is summarized in the flow chart of FIG. 2. In step S1 the mobile communication device 1 checks whether it is switched into a so called video call/conference mode. If yes, in step S2 it is checked whether there are any other mobile communication devices 1 in local area that are hailing face recognition and video call/conference capabilities on wireless or infrared communication control channels. If yes, the hailed face recognition coefficients are stored in a step S4. Further, when the mobile communication device 1 is in the video call/conference mode it monitors whether there are any faces in the current picture of the viewfinder, see step S3. If yes, the faces are analyzed and the face recognition coefficients in the current picture of the viewfinder are broadcast on wireless and IR communication channels (step S5) and any subsequent requests for video content will be served (step S7). Further, in a step S6 the mobile communication device 1 checks whether there are any FRCs being broadcast by other mobile communication devices 1 that match those of the primary user (or family member etc.) of the mobile communication device 1. If yes, the mobile communication device 1 sends out requests for the video streams from the remote devices that are broadcasting said FRCs that match this user (step S8).

Figure 4:
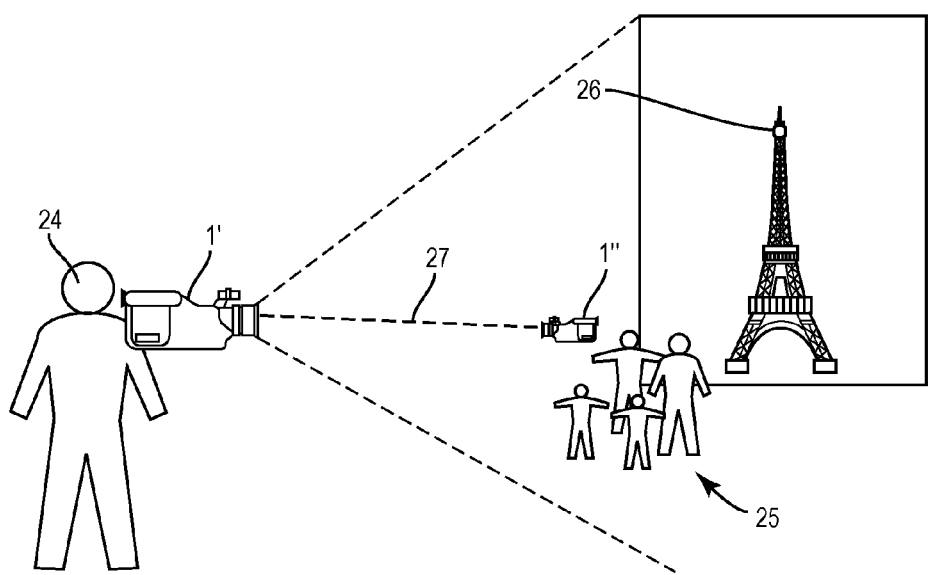
FIG. 4 shows a scheme of how to share video or still-picture contents among mobile communication devices according to the present invention.

It may also be desirable for enabled wireless mobile communication devices 1 with imaging functionality, e.g. being configured as digital cameras 1', 1", to share all content in the local vicinity regardless of use of face recognition coefficients. For instance, as shown in the sketch of FIG. 4 in front of the Eiffel Tower 26, lots of people 24, 25 would be taking videos or photographs. Since we may assume very high storage capacities on devices in the near future as well as high compression ratios and high bandwidth wireless links it will be feasible for each camera 1', 1" near the Eiffel Tower 26 to share each image or video clip taken with other camera devices 1", 1' if the user 24, 25 so desires.

It is to be noted that the invention can be applied in mobile and fixed devices incorporating some element of video conference or other communication functionality.

In a variant of the invention the camera 1' is configured to emit a focused infra red beam 27 carrying an identification code in its line of site. If this IR beam 27 is received by another camera 1" in the vicinity, it can ascertain that the emitting camera 1' has information that is of interest to its user 25.

The IR beam 27 may also be utilized to convey a face recognition coefficient (FRC) broadcast.

Another option is to utilize the IR beam 27 also for camera steering. If camera 1' is emitting the focused infra red beam 27 and camera 1" receives it, then a built-in steering mechanism (e.g. motorized or solid state) in camera 1" can be used to home in on the source of the IR beam 27, thus allowing camera 1" to steer towards camera 1'. This can be useful if both cameras are mounted on walking users, allowing a form of image stabilization.

Combining the features of FRC broadcasting and automatic camera steering face recognition based camera steering can be achieved. E.g., if camera 1" has detected face recognition coefficients correlating to the user 24 of camera 1', then camera 1" can steer it's lenses to track the relevant face of the user 24 of camera 1' in the image and send the image to camera 1'.

Figure 5:
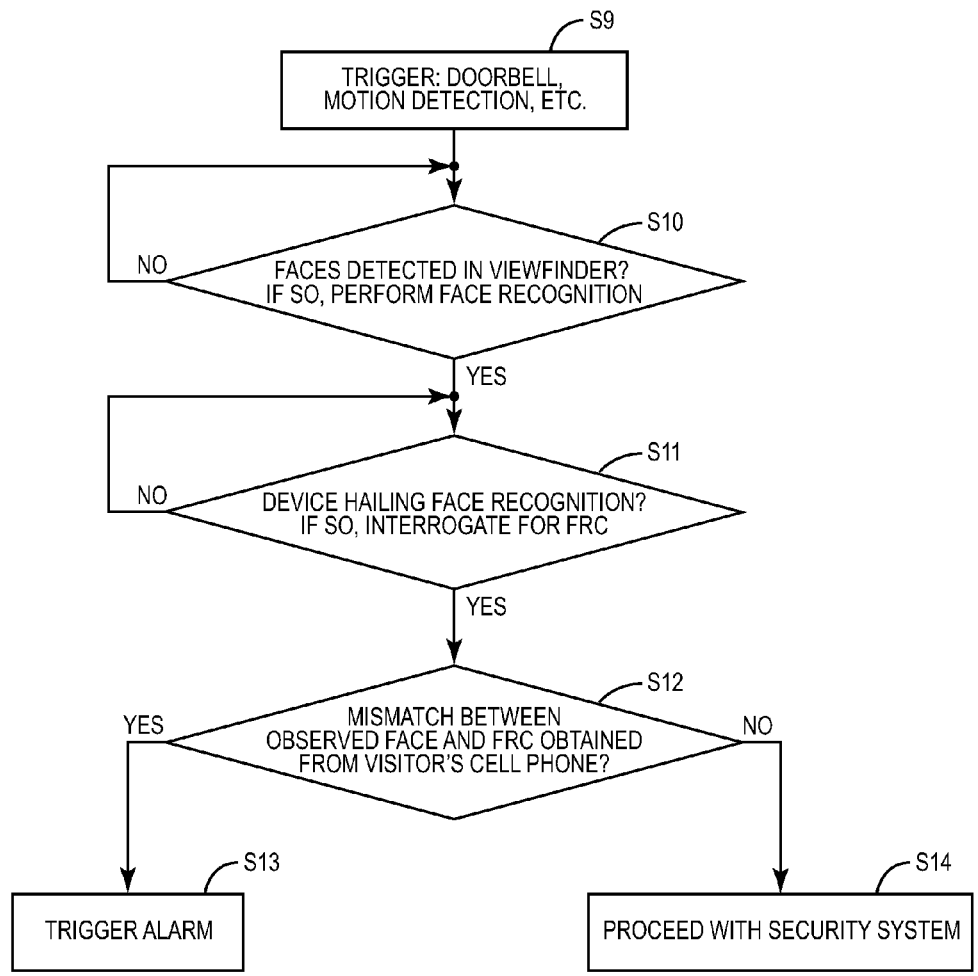
FIG. 5 shows a flow diagram of use of the present invention in a home security application.

The present invention is also applicable to improvements in home security systems as will now be explained with reference to the flow chart of FIG. 5. For instance, a front door is secured by a closed circuit TV camera above the front door. According to the invention this TV camera is configured to perform face recognition on visitors at the door and to deliver the face recognition coefficients to the home security system. This face recognition may be triggered by the visitor pressing the doorbell or by motion detection, (step S9). Upon triggering, the TV camera checks whether there are any faces present in the view finder, and if so, performs the face recognition (step S10). The home security system then checks whether there are any other devices in the local area that are hailing face recognition and video conferencing capability on infra red or wireless control channels, particularly, whether a cell phone of the visitor provides these capabilities. If so, the visitor's cell phone is interrogated for his face recognition parameters (step S11). If a mismatch is detected between the observed face and that on the visitor's cell phone (step S12), then the home security system can alert the occupant or take some other relevant action such as triggering an "unidentified visitor" alarm (step S13). Otherwise, the home security system proceeds as normal (step S14).

Note that other details from the visitor could also be displayed on the home security system, such as the visitor's business card.

The present invention is also applicable to improve the personal security. For instance, a first person being called John meets another person being called Jill for the first time. John's hands free camera phone headset with built-in face recognition capability has Jill in its field of view. It therefore detects Jill's face. John's phone also detects Jill's phone either through an ad hoc local wireless network connection between the two, or through the infra red beam emitted by Jill's hands free camera headset that is pointing at John's hands free camera headset.

John's phone then requests the owner's face recognition coefficients from Jill's phone. John's phone then runs a correlation between Jill's detected face and the face recognition coefficients for the owner of Jill's phone.

If John's phone then detects a mismatch between Jill's face as observed, and that stored on her phone, then John is alerted that Jill's identity cannot be verified by her phone. This allows John to take relevant action.

It should be observed that the term "communication device" as used herein is to be understood in a broad sense, comprising wireless data transmission functionality and picture or video taking capability, like mobile phones with built-in cameras, digital cameras (stills and video) and so on. A common feature of said communication devices according to the invention is that they are equipped with face recognition algorithms and that they are able to transmit and receive face recognition coefficients over a local wireless network to discover content containing the user's face and store in addition to the content in the devices' viewfinder.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A communication device operated by a first user and configured to receive digital pictures and/or video streams from at least one remote source not operated by the first user via at least one wireless communication channel, wherein the communication device is configured to test whether at least one person who is associated with said communication device by pre-stored person identification data is identifiable in the digital pictures and/or video streams received from the remote source, and to process the digital pictures and/or video streams received from the remote source only if the result of the person identification test is positive.

2. A communication device as claimed in claim 1, being configured to receive person identification data from the remote source and to carry out the person identification test by comparing the received person identification data with pre-stored person identification data of the person(s) associated with said communication device.

3. A communication device as claimed in claim 2, wherein the person identification data comprise face recognition coefficients (FRC).

4. A communication device as claimed in claim 1, being configured to carry out the person identification test by generating person identification data from digital pictures and/or video streams received from the remote source and comparing the generated person identification data with pre-stored person identification data of the person(s) associated with said communication device.

5. A communication device as claimed in claim 4, wherein the person identification data comprise face recognition coefficients (FRC) and wherein the communication device comprises a face recognition algorithm processor for generating the face recognition coefficients (FRC).

6. A communication device as claimed in claim 1, wherein the wireless communication channel comprises at least one of a local wireless network interface and an infrared (IR) transceiver.

7. A communication device as claimed in claim 1, comprising a camera to generate digital pictures and/or video streams and to broadcast them via the wireless communication channel.

8. A communication device as claimed in claim 7, comprising a face recognition algorithm processor for generating face recognition coefficients (FRC) from the digital pictures and/or video streams taken by the camera.

9. A communication device as claimed in claim 8, being configured to broadcast the face recognition coefficients (FRC) via the wireless communication channel.

10. A communication device as claimed in claim 8, being switchable into a training mode in which the generated face recognition coefficients (FRC) are assigned to a person associated with the communication device and are stored in the communication device.

11. A communication device as claimed in claim 8, being configured to establish or participate in video conference calls with other communication devices.

12. A communication device as claimed in claim 11, being configured to splice video streams from another communication device into the video conference call.

13. A communication device as claimed in claim 11, comprising a "speaker's token'" manager for setting up and managing a "speaker's token'" among the communication devices participating in the video conference call.

14. A communication device as claimed in claim 13, comprising a microphone wherein the "speaker's token" manager is configured to decide assignment of the "speaker's token" to one of the communication devices according to the highest voice level received by the microphone of one of the communication devices.

15. A communication device as claimed in claim 13, where in the communication device having the "speaker's token" tags the video stream of one of the other communication devices and splices it into the video conference call.

16. A communication device as claimed in claim 8, wherein a focused infrared beam is emitted along the line of site of the camera conveying face recognition coefficients (FRC) of a person associated with the communication device.

17. A communication device as claimed in claim 8, comprising camera position controller configured to steer one of the camera and a camera of a headset such that a person that has been identified in the video stream taken by either camera is kept in the center of view.

18. A communication device as claimed in claim 17, comprising a processor configured to extract face recognition coefficients (FRC) being conveyed in a focused infrared beam that is emitted by a remote communication device along the line of site of its camera, wherein the face recognition coefficients (FRC) are assigned to a person associated with the remote communication device and wherein the camera position controller is configured to steer one of the camera and a camera of a headset such that the person associated to the face recognition coefficients when identified in the video stream taken by either camera is kept in the center of view.

19. A communication device as claimed in claim 18, wherein the camera position controller is configured to steer the camera upon the focused infrared beam emitted by the remote communication device.

20. A communication device as claimed in claim 1, comprising a headset with a camera.

21. A communication device as claimed in claim 1, wherein processing the digital pictures and/or video streams of the remote source comprises storing them in the communication device.

22. A communication method performed in a communication device operated by a first user comprising:
receiving digital pictures and/or video streams from at least one remote source not operated by the first user via at least one wireless communication channel on the communication device; and
testing whether at least one person which is associated with said communication device by pre-stored person identification data is identifiable in the digital pictures and/or video streams received from the remote source and processing the digital pictures and/or video streams of the remote source only if the result of the person identification test is positive.

23. The communication method of claim 22, further comprising receiving person identification data from the remote source and carrying out the person identification test by comparing the received person identification data with pre-stored person identification data of the person(s) associated with said communication device.

24. The communication method of claim 23, wherein the person identification data comprise face recognition coefficients (FRC).

25. The communication method of claim 22, further comprising carrying out the person identification test by generating person identification data from digital pictures and/or video streams received from the remote source and comparing the generated person identification data with pre-stored person identification data of the person(s) associated with said communication device.

26. The communication method of claim 25, wherein the person identification data comprise face recognition coefficients (FRC) and wherein the communication device comprises a face recognition algorithm processor for generating the face recognition coefficients (FRC).

27. The communication method of claim 22, wherein the wireless communication channel comprises at least one of a local wireless network interface and an infrared (IR) transceiver.

28. The communication method of claim 22, further comprising generating digital pictures and/or video streams from a camera and broadcasting them via the wireless communication channel.

29. The communication method of claim 28, further comprising generating face recognition coefficients (FRC) in a face recognition processor, from the digital pictures and/or video streams taken by the camera.

30. The communication method of claim 29, further comprising broadcasting the face recognition coefficients (FRC) via the wireless communication channel.

31. The communication method of claim 30, further comprising steering one of the camera and a camera of a headset such that a person that has been identified in the video stream taken by either camera is kept in the center of view.

32. The communication method of claim 31, further comprising:
extracting face recognition coefficients (FRC) being conveyed in a focused infrared beam that is emitted by a remote communication device along the line of site of its camera, wherein the face recognition coefficients (FRC) are assigned to a person associated with the remote communication device; and
steering one of the camera and a camera of a headset such that the person associated to the face recognition coefficients when identified in the video stream taken by the either camera is kept in the center of view.

33. The communication method of claim 32, further comprising steering either camera upon the focused infrared beam emitted by the remote communication device.

34. The communication method of claim 29, further comprising being switchable into a training mode in which the generated face recognition coefficients (FRC) are assigned to a person associated with the communication device and are stored in the communication device.

35. The communication method of claim 29, further comprising emitting a focused infrared beam along the line of site of the camera conveying face recognition coefficients (FRC) of a person associated with the communication device.

36. The communication method of claim 28, further comprising establishing or participating in video conference calls with other communication devices.

37. The communication method of claim 36, further comprising setting up a "speaker's token" manager and managing a "speaker's token" among the communication devices participating in the video conference call.

38. The communication method of claim 37, wherein the communication device comprises a microphone, the method further comprising: configuring the "speaker's token" manager to decide assignment of the "speaker's token" to one of the communication devices according to the highest voice level received by the microphone of one of the communication devices.

39. The communication method of claim 37, further comprising tagging the video stream of one of the other communication devices by communication device having the "speaker's token" and splicing it into the video conference call.

40. The communication method of claim 22, wherein the communication device comprises a headset with a camera.

41. The communication method of claim 22, further comprising splicing video streams from another communication device into the video conference call.

42. The communication method of claim 29, where in processing the digital pictures and/or video streams of the remote source comprises storing them in the communication device.

43. A nontransitory machine readable medium having stored thereon a computer program product comprising instructions configured to perform a communication method when executed on a processor in a communication device operated by a first user, the communication method comprising:

receiving digital pictures and/or video streams from at least one remote source not operated by the first user via at least one wireless communication channel on the communication device; and testing whether at least one person which is associated with said communication device by pre-stored person identification data is identifiable in the digital pictures and/or video streams received from the remote source and processing the digital pictures and/or video streams of the remote source only if the result of the person identification test is positive.

\* \* \* \* \*